US008316440B1

(12) United States Patent
Hsieh et al.

(10) Patent No.: US 8,316,440 B1
(45) Date of Patent: Nov. 20, 2012

(54) SYSTEM FOR DETECTING CHANGE OF NAME-TO-IP RESOLUTION

(75) Inventors: Sheng-Chi Hsieh, Xindian (TW); Chao-Yu Chen, Taipei (TW); Chih-Chia Chen, Taichung (TW)

(73) Assignee: Trend Micro, Inc., Tokyo (JP)

( * ) Notice: Subject to any disclaimer, the term of this patent is extended or adjusted under 35 U.S.C. 154(b) by 1047 days.

(21) Appl. No.: 11/929,305

(22) Filed: Oct. 30, 2007

(51) Int. Cl.
*G06F 11/00* (2006.01)
*G06F 12/14* (2006.01)
*G06F 12/16* (2006.01)
*G08B 23/00* (2006.01)

(52) U.S. Cl. .......................................... 726/22; 713/168
(58) Field of Classification Search .................. 713/168; 726/22
See application file for complete search history.

(56) References Cited

U.S. PATENT DOCUMENTS

| | | | |
|---|---|---|---|
| 6,424,654 B1 * | 7/2002 | Daizo | 370/401 |
| 7,680,876 B1 * | 3/2010 | Cioli et al. | 709/201 |
| 7,849,502 B1 * | 12/2010 | Bloch et al. | 726/11 |
| 2002/0078382 A1 * | 6/2002 | Sheikh et al. | 713/201 |
| 2007/0169168 A1 * | 7/2007 | Lim | 726/1 |
| 2009/0077663 A1 * | 3/2009 | Sun et al. | 726/23 |

* cited by examiner

*Primary Examiner* — Kambiz Zand
*Assistant Examiner* — Dant Shaifer Harriman
(74) *Attorney, Agent, or Firm* — Beyer Law Group LLP

(57) ABSTRACT

Detection for pharming attacks and specifically for changes in name-to-IP resolutions on a computer system using rules is described. The DNS settings and the Hosts file on a computer system are monitored and their modification information is saved as a part of the historical data over time. When an IP address is determined for a host name, various rules are applied to the IP address in connection with the saved historical data, such that each rule produces a score based on various criteria. Different rules may have different weights assigned to their scores. The scores of all the rules are summed up to produce a final score. If the final score is above a predefined value, then there is a suspicious change in the IP address, and an alert is sent. Otherwise, the host name and the IP address are saved as a part of the historical data.

20 Claims, 8 Drawing Sheets

SYSTEM FOR DETECTING CHANGE OF NAME-TO-IP RESOLUTION

BACKGROUND OF THE INVENTION

The present invention generally relates to detecting and preventing pharming attacks on computer systems. More specifically, the present invention relates to using historical data to help detect pharming attacks and especially changes in name-to-IP resolutions on computer systems.

Pharming is a type of malicious attacks on computer systems that aims to redirect a legitimate website's traffic to another fake or bogus website. Often, the purpose is to steal the victims' sensitive or private information, such as access codes or passwords to financial institutions. Typically, pharming is achieved by secretively manipulating the local and/or global DNS server(s) used by the victims' computer systems, and particularly by changing or replacing the real IP addresses associated with the legitimate websites with IP addresses of the fake websites. Thereafter, when the victims attempt to access those websites whose IP addresses have been tampered with, they are directed to the fake websites instead.

Every end-point on the Internet, e.g., application servers, mail servers, work stations, personal computers, etc., has a globally unique IP (Internet Protocol) address, at least for the duration that the IP address is being used. IP addresses may be static or dynamic. A static IP address, once being assigned to an end-point, i.e., a network device, usually does not change, whereas a dynamic IP address may be assigned to different network devices at different times.

IP addresses, especially static IP addresses, may be used as identifiers or locators for computer systems or other network devices on the Internet. An IP address associated with a network device is analogous to a street address associated with a building, such that just as a street address uniquely identifies the location of a building in the real world, an IP address uniquely identifies a network device on the Internet.

There are two versions of the Internet Protocol currently in use. The common version is IPv4 (IP version 4), which uses 32-bit (4-byte) addresses. Each IPv4 address is represented as four numbers separated by dots (".") and each number is between 0 and 255 (8 bits). Thus, typical IPv4 addresses may look like "192.168.4.32" or "127.0.64.1".

The newer and less commonly used version is IPv6 (IP version 6), which uses 128-bit (16-byte) addresses. Each IPv6 address is represented as eight numbers, typically written in hexadecimal format, separated by colons (":"). Typical IPv6 addresses may look like "2004:0da8:90a3:02f0:1428:c34b:0040:1b3a".

Regardless of which version of the Internet Protocol is used, it is usually difficult for humans to remember even one or two such IP addresses, much less the IP addresses of the many websites and other network devices people frequently visit every day. To simplify the matter, directories, called Domain Name System (DNS), are created to map websites' names and other network devices' host names to their corresponding IP addresses. For example, the IP address assigned to the URL (Uniform Resource Locator) "www.yahoo.com" may be "209.131.36.158", and the IP address assigned to the URL "www.trendmicro.com" may be "216.246.93.75". When a person wishes to visit the Yahoo!® main home page "www.yahoo.com", he may enter this name into the URL field of the web browser on his computer. The computer, or more specifically, the web browser, then queries a DNS server for the IP address associated with the application server that hosts the URL "www.yahoo.com". The DNS server looks up the correct IP address for the name "www.yahoo.com" and returns the address "209.131.36.158" to the web browser so that the web browser may contact "www.yahoo.com" using the correct IP address. This process is often referred to as "name-to-IP resolution".

Suppose a criminal wants to steal people's private information, such as user names and passwords, from a bank's website, e.g., "www.bank.com". He sets up a fake bank website, e.g., "www.fake-bank.com", that appears as an exact duplicate of the real bank website, "www.bank.com". The IP address assigned to the real bank website may be "192.80.0.16", while the IP address associated with the fake bank website may be "162.32.8.0". To hijack traffic from the real bank website to the fake bank website, the criminal replaces the real IP address, i.e., "192.80.0.16", for "www-.bank.com" on the DNS server with the IP address of the fake bank website, i.e., "162.32.8.0". Thereafter, when the victims' computers query the DNS server for the IP address of the application server serving the website "www.bank.com", the compromised DNS server returns "162.32.8.0" instead, and the victims' computers are directed to the application server hosting the fake bank website. The unsuspecting victims enter their user names and passwords at the fake bank website, which are then stolen by the criminal.

Pharming attacks occur on several levels. First, a criminal may attack Hosts files on individual computers. A Hosts file is a computer file that is used to store information for mapping host names to IP addresses. It may be used as a supplement to or in place of the DNS server. A Hosts file is under the control of the computer's owner or user. If a Hosts file is compromised, it only affects the particular computer system on which the file is located. Next, the criminal may attack local network routers. For example, an attacker may replace a router's legitimate DNS server with a fake DNS server under the criminal's control. This causes more problems than Hosts file attacks, because a compromised router affects computers on the entire local area network (LAN), as most routers specify a trusted DNS server to their clients as they join the LAN. Finally, the criminal may attack DNS servers directly and replace real IP addresses for the host names with fake IP addresses.

Pharming is becoming a major concern, especially to businesses hosting e-commerce and online banking websites. Existing methods for combating pharming attacks, i.e., anti-pharming, include protections for application servers, DNS servers, web browsers, etc. Nevertheless, continuous efforts are being made to improve anti-pharming protections, and especially to improve the ability of detecting and preventing pharming attacks on individual computer systems.

SUMMARY OF THE INVENTION

Broadly speaking, the present invention generally relates to detecting and preventing pharming attacks, and especially changes in name-to-IP resolutions, on computer systems.

According to various specific embodiments of the invention, methods and apparatus are provided in which historical data saved on a computer system is used in connection with various rules to detect suspicious changes in name-to-IP resolutions. The DNS settings and the Hosts file on the computer system are monitored, and their respective historical data are saved to one or more historical tables over time.

When a name-to-IP value is determined, i.e., a host name is mapped to an IP address, one or more rules are applied to the name-to-IP value, where each rule produces a score. The score for a particular rule may be 0 if there is no suspicious activity related to that rule. For example, one rule may detect the distance of the current IP address to historically saved IP address(es) for the same host name. If the distance is greater than a predefined value, then this rule produces a score. Another rule may indicate a change in the DNS server. If the IP address of the DNS server that performs the name-to-IP resolution for the same host name has changed, then this rule produces a score. A third rule may focus on changes in the DNS settings on the computer system. If there has been a change to the DNS settings within a predefined time period, then this rule produces a score. A fourth rule may focus on changes in the Hosts file on the computer system. If there has been a change to the Hosts file within a predefined time period, then this rule produces a score.

Based on various criteria, each rule produces a score. Different rules may have different weights assigned to their scores. For example, an important rule may have a greater weight in the final analysis. The scores of all the rules are summed up to produced a final score. If the final score is higher than a predefined value, then the change in name-to-IP value is considered suspicious and the owner or user of the computer system is alerted.

BRIEF DESCRIPTION OF THE DRAWINGS

These and other features, aspects, and advantages of the invention will be described in more detail below in the detailed description and in conjunction with the following figures.

The present invention is illustrated by way of example, and not by way of limitation, in the figures of the accompanying drawings and in which like reference numerals refer to similar elements and in which.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. In addition, while the invention will be described in conjunction with the particular embodiments, it will be understood that this description is not intended to limit the invention to the described embodiments. To the contrary, the description is intended to cover alternatives, modifications, and equivalents as may be included within the spirit and scope of the invention as defined by the appended claims.

Pharming hijacks traffic of a legitimate website and redirects it to another fake website. Usually, this is done by manipulating Hosts files on individual computers, DNS settings of individual computers or network routers, and/or DNS servers, such that name-to-IP resolutions produce wrong IP addresses. For example, when mapping the legitimate website to an IP address, the IP address of the fake website is returned instead. To combat pharming attacks, methods and apparatus are provided to detect suspicious changes in name-to-IP values, i.e., IP addresses mapped from host names.

According to various embodiments, the DNS settings and the Hosts file of a computer system are monitored and their information is saved on the computer system over time as historical data. When a host name is mapped to an IP address, various rules are applied to the mapped IP address to determine if there is a suspicious change in the mapped IP address. Each rule produces a score based on some criteria, and the scores of different rules may be assigned different weights depending on the importance of the respective rules. The scores of all the rules are summed up to produce a final score. If the final score is higher than a predefined value, then the change in the mapped IP address is considered suspicious and the owner of the computer system is alerted.

Figure 1:
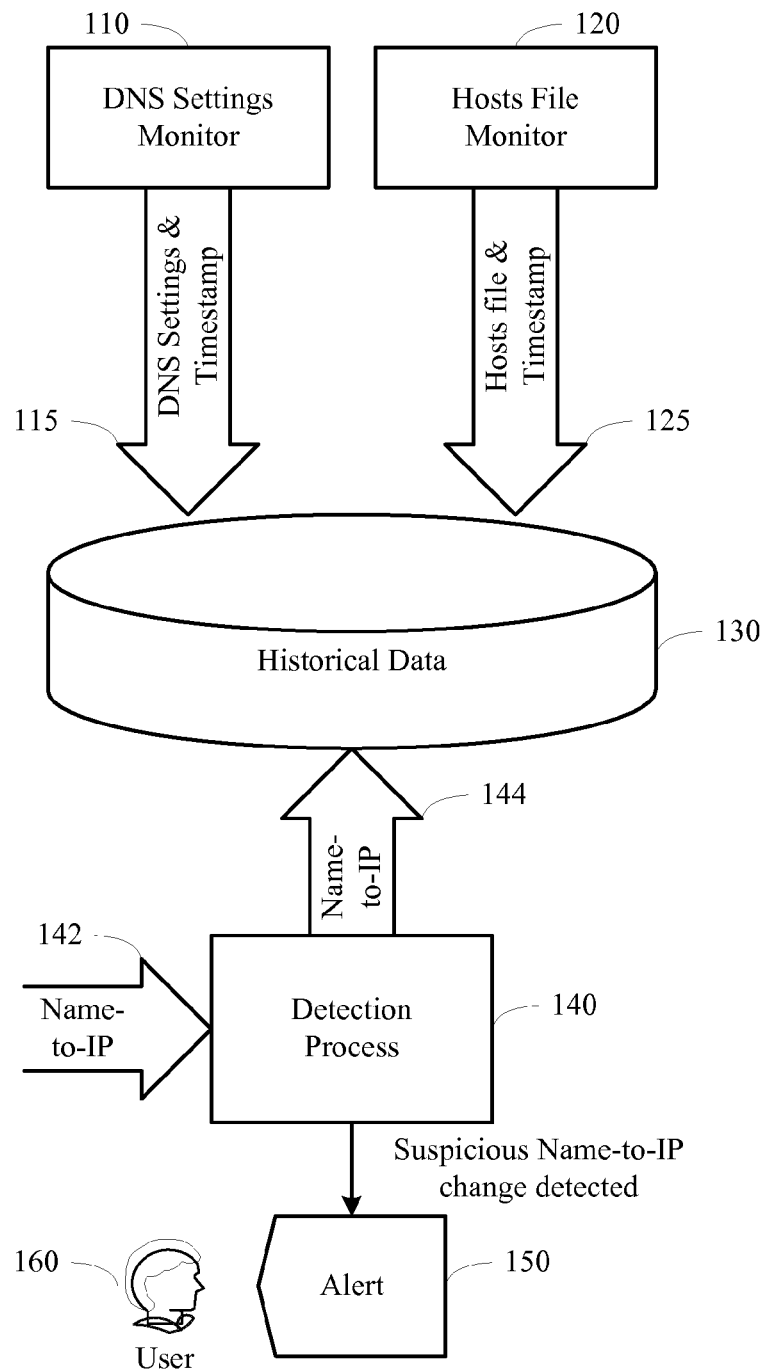
FIG. 1 illustrates a system for monitoring DNS settings and Hosts file of a computer system and detecting suspicious name-to-IP changes.

FIG. 1 illustrates a system for monitoring DNS settings and Hosts file of a computer system and detecting suspicious name-to-IP changes. There are two monitoring processes: one monitors the changes in the DNS settings on the computer system, while the other monitors the changes in the Hosts file on the computer system.

On each computer system, there is a setting, typically as a part of the operating system, that specifies the DNS server from which queries should be made whenever the computer and more specifically, the operating system or an application program running on the computer, such as a web browser, needs to map a particular host name to an IP address, i.e., to obtain name-to-IP resolution. This is called the computer's DNS settings. For example, for a computer having a version of Microsoft's Windows operating system, the computer's DNS settings may be specified as a part of the operating system's Internet Protocol (TCP/IP) properties. In the DNS settings, the IP address of the DNS server may be specified. Often times, more than one IP addresses may be specified, such as one IP address for a preferred DNS server and another IP address for an alternate DNS server. For example, the IP address for the preferred DNS server may be "122.36.184.3" and the IP address for the alternate DNS server may be "122.36.184.6".

A host name is a unique name by which a network device is known on the network. The precise definition of the word "host name" varies slightly between various naming systems, such as NIS (Network Information Service), DNS, SMB (Server Message Block), etc. However, on the Internet, a host name typically is a combination of a host device's local hostname and its parent domain name. Each host name is associated with a unique IP address. For example, the host name "mail.yahoo.com" may have an IP address "209.73.168.74". As explained before, a host name may be translated or mapped into an IP address via the local Hosts file on the computer or the DNS server, and this is called "name-to-IP resolution". If the DNS server is queried for the IP address of a host name, then the computer sends the query request to the DNS server specified in the computer's DNS settings. In the above example, the computer first sends the query request to the preferred DNS server at IP address "122.36.184.3". If the preferred DNS server is not available, then the computer sends the query request to the alternate DNS server at IP address "122.36.184.6".

The DNS Settings Monitor 110 monitors any changes in the computer's DNS settings. If the IP addresses of any of the DNS servers are changed in the computer's DNS settings, then the previous DNS settings and a timestamp indicating the time of the change 115 are saved in the Historical Data 130. In the above example, suppose the DNS settings of the computer previously specify IP address "122.36.184.3" for the preferred DNS server and IP address "122.36.184.6" for the alternate DNS server. Then at some point, the IP addresses for either the preferred DNS server or the alternate DNS server or both have been changed in the computer's DNS settings. The DNS Settings Monitor 110 saves the two older IP addresses "122.36.184.3" and/or "122.36.184.6" and the time the change is made, e.g., Oct. 18, 2007 at 11:25 am, to Historical Data 130. The Hosts File Monitor 120, on the other hand, monitors changes made to the computer's Hosts file. As explained before, a Hosts file stores information that may be used to map host names to IP addresses, and may be used as a supplement to or in place of the DNS servers. A sample Hosts used by a version of Microsoft's Windows operating system may include the following entries:

```
127.0.0.1           localhost
102.54.94.97        rhino.acme.com
38.25.63.10         x.example.com
...
```

If any entry in the Hosts file is changed, then the new, modified version of the Hosts file and a timestamp indicating the time of the change 125 are saved in the Historical Data 130. Thus, if, for example, the IP address for "rhino. acme.com" in the above Hosts file has been changed to "80.200.92.0", the Hosts File Monitor 120 saves the new Hosts file having the modified IP address "80.200.92.0" for "rhino.acme.com" and the time the change is made, e.g. Oct. 18, 2007 at 12:56 pm, to Historical Data 130. This means that the Hosts file saved in the Historical Data 130 is always the latest, most current version.

The DNS Settings Monitor 110 and the Hosts File Monitor 120 monitor the DNS settings and the Hosts file of the computer system respectively and continually. If any changes are made to the DNS settings and the Hosts file of the computer system, the changes are recorded in the Historical Data 130 along with a timestamp indicating the time the changes are being made.

In one or more embodiments, the DNS Settings Monitor 110 and the Hosts File Monitor 120 periodically check the DNS settings and the Hosts File content respectively to see if any entry or value has been changed by comparing the content against the appropriate data saved in the Historical Data 130. The check may occur, for example, once per minute.

Alternatively, for monitoring the Hosts file on a version of Microsoft's windows operating system, the APIs (Application Programming Interface) provided by the operating system for monitoring a directory may be used. In this case, if any file in a monitored directory is changed, the operating system notifies the monitoring process. Thus, the Hosts File Monitor 120 may use the APIs to monitor the directory where the Hosts file is located, and if the Hosts file is modified, the operating system will notify the Hosts File Monitor 120.

The Detection Process 140 detects any suspicious changes in name-to-IP resolution 142. When the computer obtains an IP address for a host name, either from the local Hosts file or by querying a DNS server, the Detection Process 140 analyzes the host name and the IP address based on various rules and in connection with the data saved in Historical Data. If the analysis indicates that the IP address is suspicious, then the Detection Process 140 alerts 150 an owner or user 160 of the computer system.

The alert 150 to the user 160 may take various formats. For example, the alert 150 may be an email message, an instant message, a pop-up window that includes a message, a short text message to the user's mobile telephone or Personal Digital Assistant (PDA), a telephone call to the user's mobile telephone or other telephones, etc. The user 160 may specify his or her preference for receiving the alert 150.

On the other hand, if the analysis indicates that the IP address is not suspicious and acceptable, then the Detection Process 140 saves the IP address along with the host name, the IP address of the DNS server, and a timestamp indicating the time when the data is stored in the Historical Data 130. The Detection Process 140 is described in more detail below in FIG. 2.

Thus, three kinds of data are saved in the Historical Data 130. First, the DNS Settings Monitor 110 saves the DNS settings and a last-modified timestamp to the Historical Data 130 every time the computer's DNS settings are changed. Next, the Hosts File Monitor 120 saves the most current Hosts file and a last-modified timestamp to the Historical Data 130 every time the computer's Hosts file is changed. Finally, the Detection Process 140 saves a host name, its associated IP address, the IP address of the DNS server that performs the name-to-IP resolution, and a timestamp to the Historical Data 130 every time a legitimate IP address is determined.

To prevent the Historical Data 130 from growing too large, the entries for the host name-IP address-DNS server sets may be periodically removed as they become expired. For examples, a timeframe may be specified by a user, such that entries for the host name-IP address-DNS server sets may be removed if they are older than the user-specified timeframe. Alternatively, if the user chooses not to specify a timeframe, a default timeframe may be used for removing the host name-IP address-DNS server entries. This may be achieved by checking the timestamp saved in the Historical Data 130 along with each set of host name, IP address, and DNS server IP address.

The Historical Data 130 is a data repository that may take various forms. The data may be saved in a file on the computer or in a data base communicatively connected to the computer. The data saved in the Historical Data 130 may be stored as a table. The following Table 1 is a sample table that may be used to store various types of historical data.

TABLE 1

Historical Data Table

| Data Type | Data | |
|---|---|---|
| Mapped IP address | host name | onlinebanking.bank.com |
| | host IP address | 128.200.80.4 |
| | DNS server IP address | 121.80.200.4 |
| | timestamp | Oct. 9, 2007, 08:34:6 |
| DNS settings | dns1.server.com | 121.80.200.2 |
| | dns2.server.com | 121.80.200.4 |
| | timestamp | Oct. 18, 2007, 13:47:20 |
| Mapped IP address | host name | www.cnn.com |
| | host IP address | 64.236.16.20 |
| | DNS server IP address | 97.203.132.54 |
| | timestamp | Oct. 18, 2007, 20:8:21 |
| Mapped IP address | host name | www.wellsfargo.com |
| | host IP address | 151.151.31.133 |
| | DNS server IP address | 97.203.132.54 |
| | timestamp | Oct. 19, 2007, 6:43:21 |

TABLE 1-continued

Historical Data Table

| Data Type | Data | |
|---|---|---|
| Mapped IP address | host name | onlinebanking.bank.com |
| | host IP address | 128.200.80.16 |
| | DNS server IP address | 97.203.132.56 |
| | timestamp | Oct. 19, 2007, 12:32:7 |
| Hosts file | localhost | 127.0.0.1 |
| | mail.company.com | 54.38.150.10 |
| | news.company.com | 54.38.150.20 |
| | timestamp | Oct. 20, 2007, 08:54:30 |
| Mapped IP address | host name | www.hotmail.com |
| | host IP address | 216.74.180.189 |
| | DNS server IP address | 97.203.132.54 |
| | timestamp | Oct. 20, 2007, 09:2:21 |
| Mapped IP address | host name | accountonline.citibank.com |
| | host IP address | 192.193.226.190 |
| | DNS server IP address | 97.203.132.56 |
| | timestamp | Oct. 21, 2007, 18:25:6 |
| Mapped IP address | host name | cn.yahoo.com |
| | host IP address | 202.165.102.205 |
| | DNS server IP address | 97.203.132.54 |
| | timestamp | Oct. 23, 2007, 10:8:32 |
| DNS settings | dns1.server.com | 97.203.132.54 |
| | dns2.server.com | 97.203.132.56 |
| | timestamp | Oct. 30, 2007, 20:09:19 |
| Mapped IP address | host name | onlinebanking.bank.com |
| | host IP address | 128.200.80.2 |
| | DNS server IP address | 218.0.20.4 |
| | timestamp | Nov. 2, 2007,11:2:6 |
| ... | ... | |

Of course, depending on the actual implementation, the Historical Data 130 may be stored in multiple tables. For example, there may be three separate historical tables, one for storing information relating to modifications made to the DNS settings, another one for storing information relating to modifications made to the Hosts file, and the third one for storing information relating to legitimate name-to-IP resolution results. And the actual formats of the tables may vary as well. The following Table 2 is a sample table that may be used to store only historical data for mapped IP address.

TABLE 2

Historical Data Table for Mapped IP Address

| Timestamp | Host Name | Host IP Address | DNS Server IP Address |
|---|---|---|---|
| 20070912:092223 | www.example1.com | 10.0.0.1 | 10.0.0.40 |
| 20070912:092224 | www.example2.com | 10.0.0.2 | 10.0.0.40 |
| 20070912:092230 | www.example1.com | 10.0.0.4 | 10.0.0.50 |
| 20070912:092242 | www.example3.com | 10.0.0.8 | 10.0.0.50 |
| ... | ... | ... | ... |

The following Table 3 is a sample table that may be used to store only historical data for DNS settings.

TABLE 3

Historical Data Table for DNS Settings

| Timestamp | DNS Settings | |
|---|---|---|
| 20070830:092012 | 10.0.32.40 | dns1.example.com |
| | 10.0.32.50 | dns2.example.com |
| ... | | ... |

The following Table 4 is a sample table that may be used to store only historical data for Hosts file content.

TABLE 4

Historical Data Table for Hosts File

| Timestamp | Hosts File Content | |
|---|---|---|
| 20070812:153401 | 120.50.132.10 | www.example1.com |
| | 122.70.200.50 | www.example2.com |
| | 32.240.80.120 | www.example3.com |
| ... | | ... |

Figure 2:
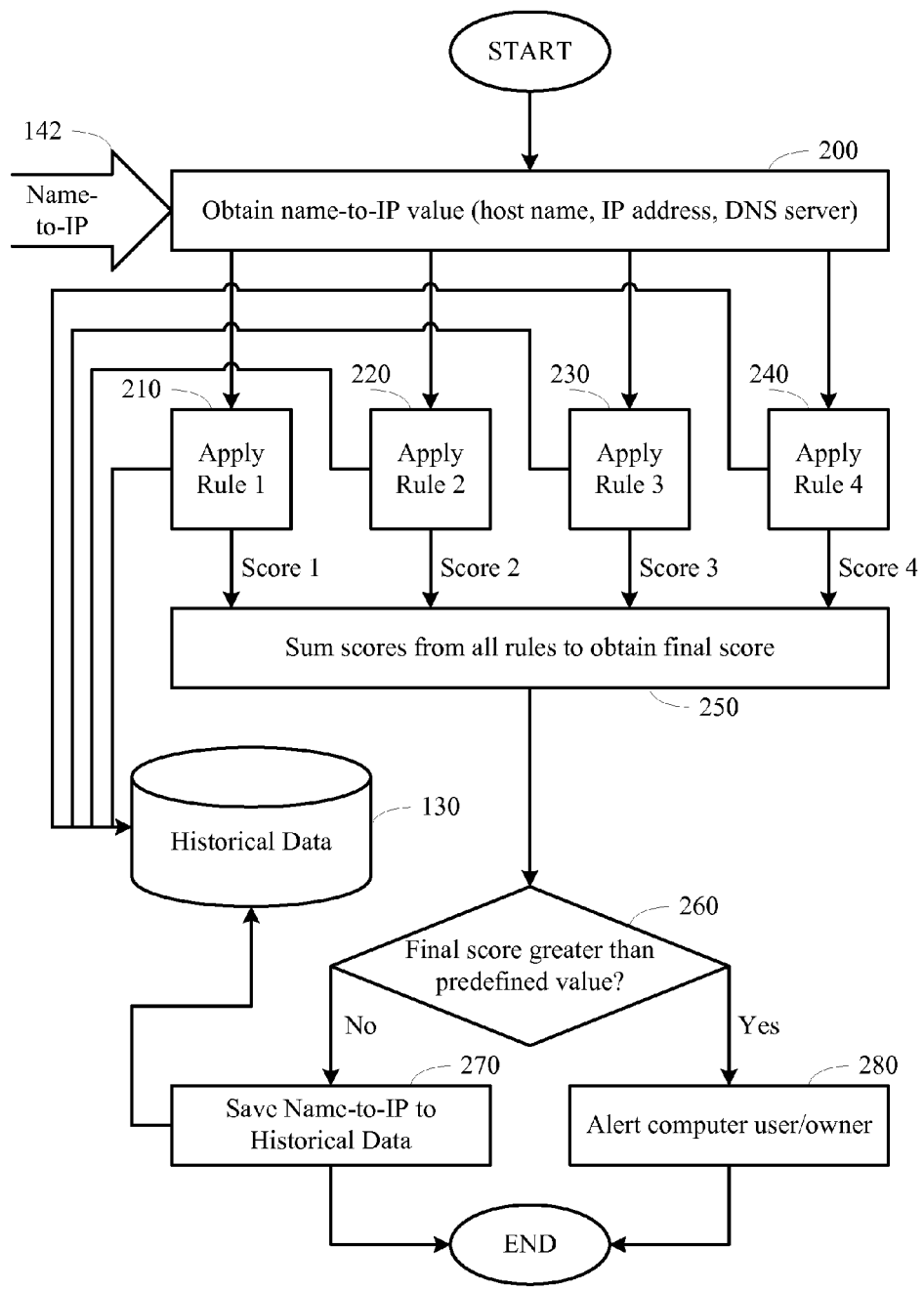
FIG. 2 illustrates a method of detecting suspicious IP addresses.

The Historical Data 130 helps the Detection Process 140 to detect suspicious IP addresses mapped to host names. FIG. 2 illustrates a method of detecting suspicious IP addresses, i.e., the Detection Process 140 shown in FIG. 1.

Once the computer has queried a DNS server or its local Hosts file to obtain the IP address associated with a host name, the DNS server, for example, returns the IP address (FIG. 2, 142). Suppose that the host name in this example is "onlinebanking.bank.com" and the IP address resolved by the DNS server is "64.128.90.2". The DNS server queried by the computer is "dns1.server.com" and its IP address is "97.203.132.54" The Detection Process (FIG. 1, 140) takes these data (FIG. 2, step 200), and applies various rules (FIG. 2, steps 210, 220, 230, 240) to determine whether the IP address "64.128.90.2" mapped by the DNS sever for the host name "onlinebanking.bank.com" is suspicious.

Although FIG. 2 shows four rules, the actual number of rules applied during the Detection Process (FIG. 1, 140) may vary among the various implementations of the method. These rules aim to detect unauthorized tampering with either the DNS settings or Hosts file on the local computer or the DNS sever from which the computer queries for the name-to-IP resolution. The rules are described in more detail below in FIGS. 3-6.

Regardless of the number of rules applied, each rule produces a score. A score from a rule may be any number that is greater than or equal to 0. Usually, if a particular rule does not detect anything suspicious, then the score for that rule is "0", i.e., no score. Otherwise, the score for that rule has a positive number.

The scores from all the rules are summed up to obtain a final score (FIG. 2, step 250). Each rule may be assigned a different weight, depending on the importance of the rule. A more important rule may be assigned a greater weight than a less important rule, and the weights of the rules may change as needed. Thus, the final score may be calculated using the following formula:

$$\text{final\_score} = \sum_{i=1}^{i=n} S_i * w_i$$

Where $S_i$ is the score produced by rule i and $w_i$ is the weight assigned to rule i. Note that $w_i$ is a positive number, i.e., greater than 0.

In a simple example, each rule may have two possible base scores. If a particular rule detects anything suspicious, then the base score for that rule is "1". On the other hand, if a particular rule does not detect anything suspicious, then the base score for that rule is "0". Next, each rule is assigned a weight depending on the relative importance of the rule. The more important a rule is considered, the greater weight it has. Suppose that one rule, referred to as $Rule_1$, has a weight of "10", because it is considered a very important rule. Another rule, referred to as Rule$_2$, has a weight of "5", because it is considered moderately important. A third rule, referred to as Rule$_3$, has a weight of "1", because it is not an important rule.

Applying Rule$_1$, Rule$_2$, and Rule$_3$ to a pair of host name and IP address under analysis, Rule$_1$ produces a base score of "1" (because Rule$_1$ has detected something suspicious in the IP address), Rule$_2$ produces a based score of "0", and Rule$_3$ produces a based score of "1". The final score then is $$1*10+0*5+1*1=11$$

The final score is compared against a predefined value (FIG. 2, step 260). If the final score is greater than the predefined value, then the IP address is considered suspicious, and the owner or user of the computer is alerted (FIG. 2, step 280). On the other hand, if the final score is less than or equal to the predefined value, then the IP address is considered legitimate, and the host name-IP address-DNS server set is saved in the Historical Data 130.

Figure 3:
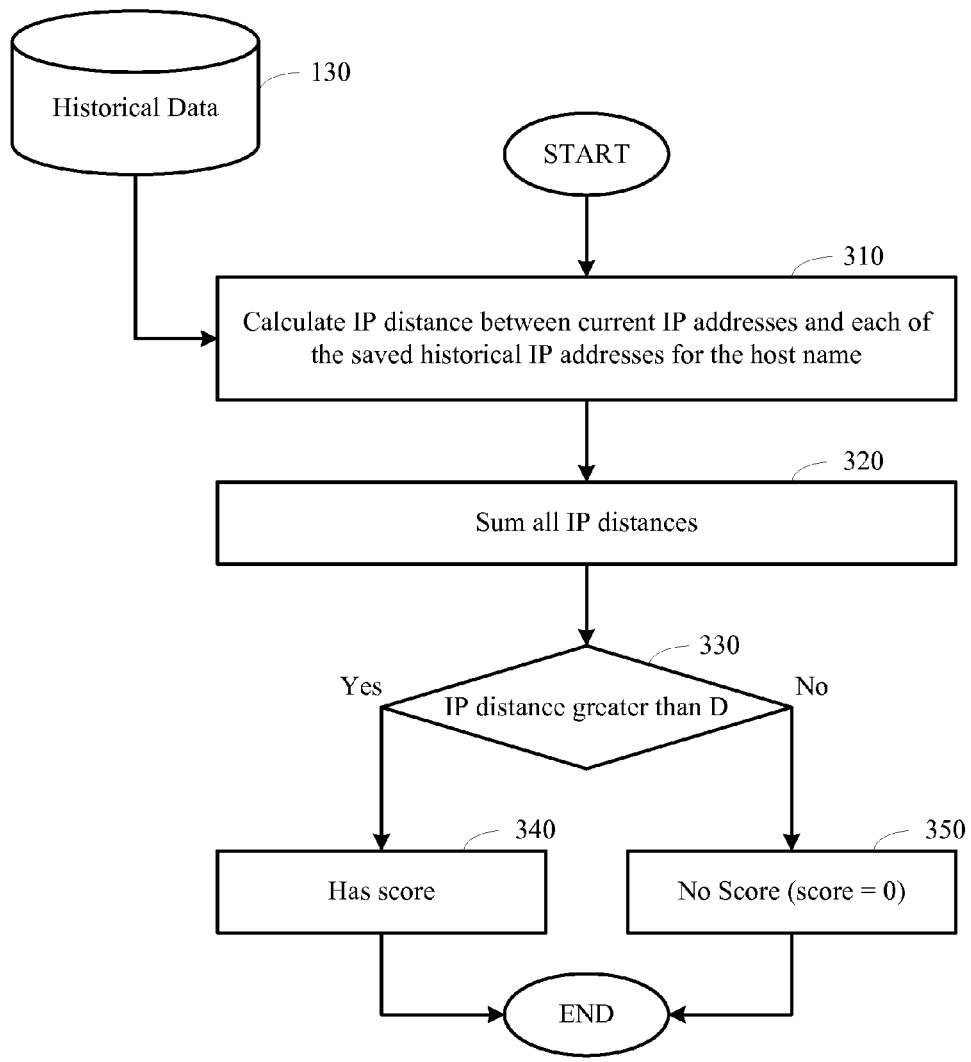
FIGS. 3-6 illustrate methods of applying four different rules respectively to detect suspicious IP addresses.

FIGS. 3-6 illustrate methods of applying four different rules respectively to detect suspicious IP addresses. Rule 1 (FIG. 3) compares the distances of the current IP address under analysis against the historical IP addresses for the same host name saved in the Historical Data 130. First, the distance between the current IP address and each of the saved IP addresses for the same host name is calculated (FIG. 3, step 310).

Using the example of "onlinebanking.bank.com", the current IP address associated with this host name under analysis is "64.128.90.2" (hereinafter referred to as "IP$_X$"). In the sample historical table shown in Table 1, there are three entries for the host name "onlinebanking.bank.com". The first entry indicates that the IP address "128.200.80.4" is associated with the host name "onlinebanking.bank.com" (hereinafter referred to as "IP$_A$"). The second entry indicates that the IP address "128.200.80.16" is also associated with the host name "onlinebanking.bank.com" (hereinafter referred to as "IP$_B$"). And the third entry indicates that the IP address "128.200.80.2" is associated with the host name "onlinebanking.bank.com" (hereinafter referred to as "IP$_C$"). The respective distances between IP$_X$ and IP$_A$, IP$_B$, and IP$_S$ are calculated.

To calculate a distance between two IP addresses, the two IP addresses are first converted into two 4-byte integers. Each of the four groups of numbers separated by dots (".") in an IP address takes 1 byte (8-bit) in the integer. Thus, for IP$_X$, the integer written in hexadecimal format is 0x40805A02 (0x40=64; 0x80=128; 0x5A=90; and 0x02=2); for IP$_A$, the integer written in hexadecimal format is 0x80C85004; for IP$_B$, the integer written in hexadecimal format is 0x80C85010; and for IP$_C$, the integer written in hexadecimal format is 0x80C85002. The distance between any two IP addresses may be calculated using the following formula:

$$IP\_distance=abs(IP\_address\_1-IP\_address\_2)$$

The distance between IP$_X$ and IP$_A$ is 0x4047F602 (hereinafter referred to as D$_{XA}$). The distance between IP$_X$ and IP$_B$ is 0x4047F60E (hereinafter referred to as D$_{XB}$). And the distance between IP$_X$ and IP$_C$ is 0x4047F600 (hereinafter referred to as D$_{XC}$).

Next, all the distances between the current IP address and the historically saved IP addresses for the same host name is summed up to produce a total distance, D$_{total}$ (FIG. 3, step 320). In the example of "onlinebanking.bank.com", the total distances is:

$$D_{total}=D_{XA}+D_{XB}+D_{XC}=0x4047F602+0x4047F60E+ \\ 0x4047F600=0xC0D7E210$$

Finally, the total distance, D$_{total}$, is compared against a predefined value D (FIG. 3, step 330). If D$_{total}$ is greater than D, then this rule has a score (FIG. 3, step 340). Otherwise, this rule has no score, i.e., score=0 (FIG. 3, step 350).

Rule 1 detects pharming attacks that replace the IP address of a host name with the IP address of a fake host on the DNS server or in the Hosts file. Typically, IP addresses within the same domain tend to have similar numbers. For example, network devices that belong to the same domain may have the same first two or three numbers in their IP addresses and only the last one or two numbers vary from device to device. Therefore, if the IP address for a host name has been changed legitimately, the new IP address is usually very similar to the old IP address. For example, the old IP address for the host name "onlinebanking.bank.com" may be "128.200.80.4" and the new IP address for the same host name may be "128.200.80.2". This means that the distance between these two IP addresses is small—"2" in this example.

On the other hand, IP addresses for network devices from different domains tend to have very different numbers. If the IP address of a host name is replaced with the IP address associated with a fake host belonging to another domain, then the distance between the new IP address and the old IP address tend to be very big. By choosing an appropriate predefined value for D, Rule 1 may detect whether the IP address under analysis tend to belong to the same domain as the saved IP addresses for the same host name. For example, D may be 0x10000.

Of course, if no entry for a particular host name is found in the Historical Data 130, then Rule 1 produces no score, since no distance comparison may be made in this case.

Figure 4:
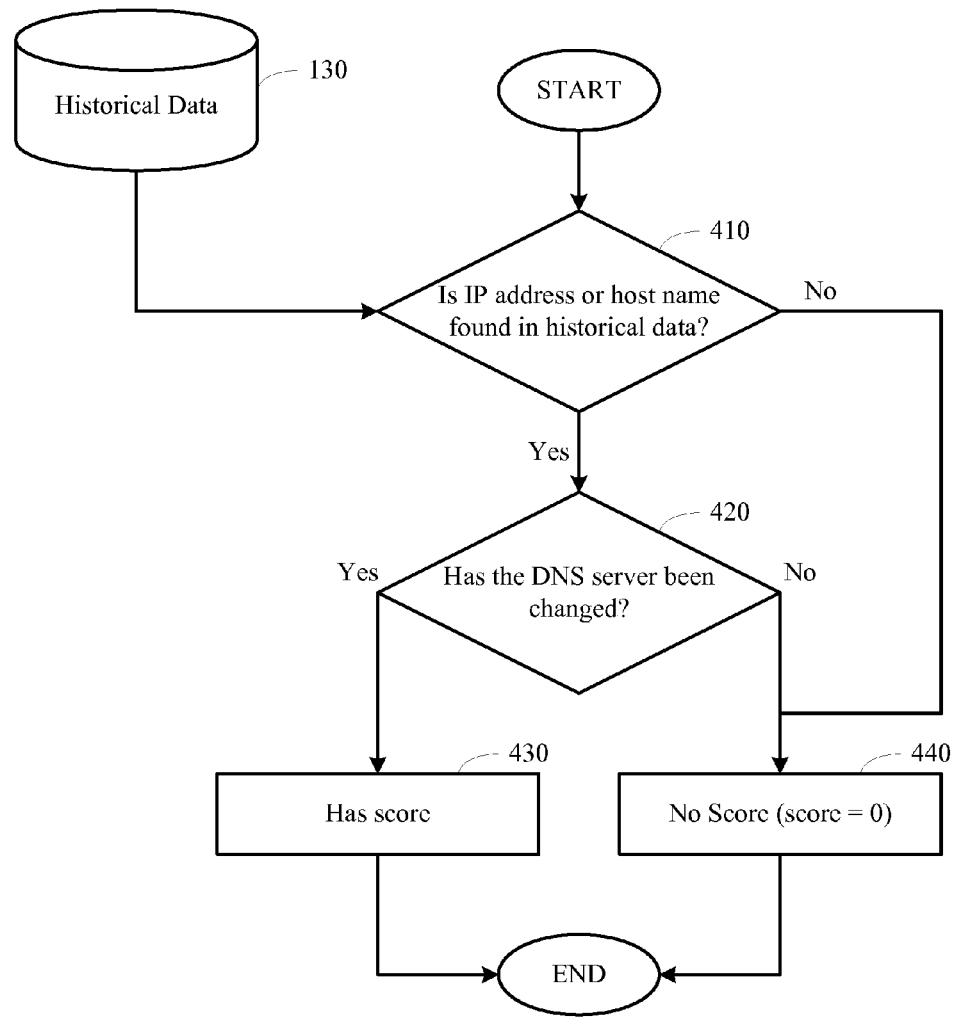

Rule 2 (FIG. 4) determines whether the DNS server that performs the name-to-IP resolution for the host name has been changed. First, the Historical Data 130 is searched to determine whether an entry for the current IP address or host name under analysis has been saved there (FIG. 4, step 410). If no entry is found, then this rule produces no score (score=0), because no historical data exists for any comparison (FIG. 4, step 440).

On the other hand, if one or more entries have been found, then a determination is made as to whether the current DNS server that performs the name-to-IP resolution for the host name, i.e., the DNS sever queried by the computer that returns the IP address under analysis, has been changed (FIG. 4, step 420). If the IP address of the DNS server has not been changed, then this rule produces no score (FIG. 4, step 440). Otherwise, this rule produces a positive number score (FIG. 4, step 430).

Using the "onlinebanking.bank.com" example, the IP address of the DNS server queried by the computer is "97.203.132.54". This differs from the IP addresses of the DNS servers saved in the historical table, Table 1, for entries associated with "onlinebanking.bank.com" (for example, the last entry associated with "onlinebanking.bank.com" has an associated DNS server IP address "218.0.20.4"). Thus, Rule 2 produces a score in this case.

Rule 3 (FIG. 5) determines whether the local DNS settings of the computer system has been changed during a predefined period. Recall that the DNS Settings Monitor (FIG. 1, 110) monitors any changes to the local DNS settings on the computer system, and if any change is made to the DNS settings, the old DNS settings along with a timestamp indicating the time the change is made are saved in the Historical Data 130.

Figure 5:
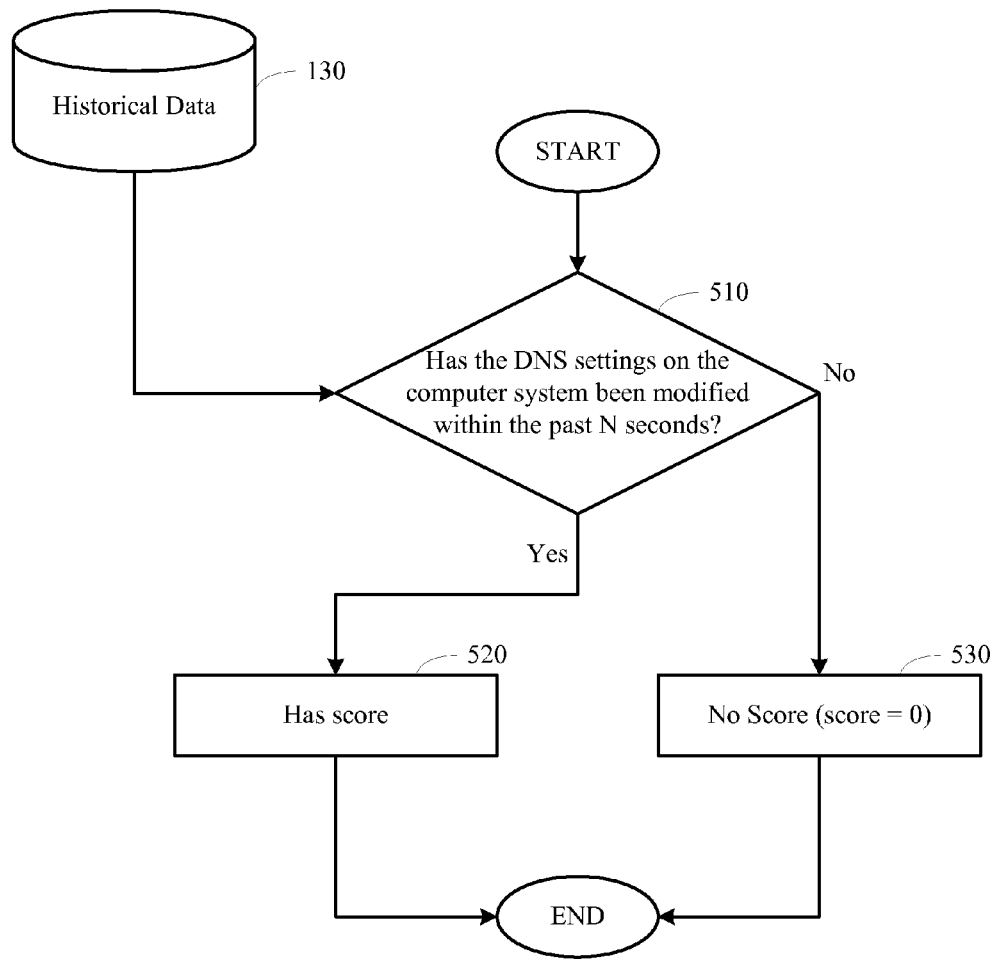

Thus, by analyzing the Historical Data 130 and comparing the last-modified timestamp for the DNS settings with the current time, if it is determined that the DNS settings have been modified within the past N seconds (FIG. 5, step 510), where N is a predefined number, then this rule produces a score (FIG. 5, step 520). Otherwise, this rule produces no score (FIG. 5, step 530).

Rule 3 determines possible attacks on the computer's DNS settings. The value for N may be chosen based on the actual requirements of the computer system and may vary from time to time as needed. For example, one possible value for N may be 12 hours (43,200 seconds).

Figure 6:
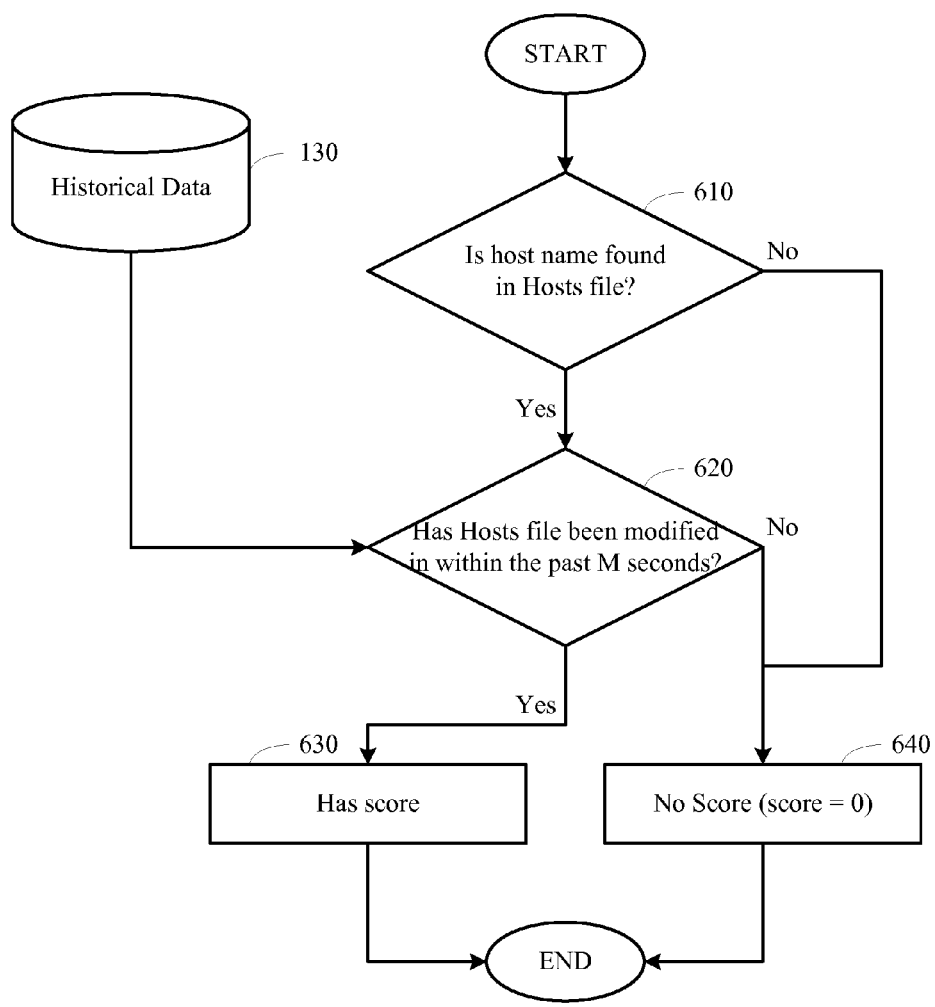

Rule 4 (FIG. 6) determines whether the local Hosts file of the computer system has been changed during a predefined period. First, a determination is made as to whether the current host name under analysis is found in the Hosts file (FIG. 6, step 610). If the host name is not found in the Hosts file, then this rule produces no score (score=0), because changes to the Hosts file does not affect the IP address mapped for this host name (FIG. 6, step 640).

On the other hand, if the host name is found in the Hosts file, then a determination is made as to whether the Hosts file has been modified during the past M seconds, where M is a predefined value (FIG. 6, step 620). Recall that the Hosts File Monitor (FIG. 1, 120) monitors any changes to the entries of the local Hosts file on the computer system, and if any change is made to the Hosts file, the newly modified Hosts file along with a timestamp indicating the time the modification is made are saved in the Historical Data 130. By analyzing the Historical Data 130 and compare the last-modified timestamp saved for the Hosts file and the current time, a time period may be calculated that shows how much time has lapsed since the last time the Hosts file has been modified. If it is determined that the Hosts file has been modified within the past M seconds, then this rule produces a score (FIG. 6, step 630). Otherwise, this rule produces no score (FIG. 6, step 640).

Rule 4 determines possible attacks on the computer's Hosts file. The value for M may be chosen based on the actual requirements of the computer system and may vary from time to time as needed. For example, one possible value for M may be 12 hours (43,200 seconds).

The methods shown in FIGS. 2-6 may be implemented as computer software programs. Similarly, each component shown in FIG. 1, i.e., DNS Settings Monitor 110, Hosts File Monitor 120, Detection Process 140, and Alert 150, may also be implemented as computer software programs. Depending on the actual implementation, the software programs may be written in computer languages such as C++, C, Java™, Pascal, etc. Alternatively, it is also possible to implement some of the functionalities for these components in hardware.

Figure 7:
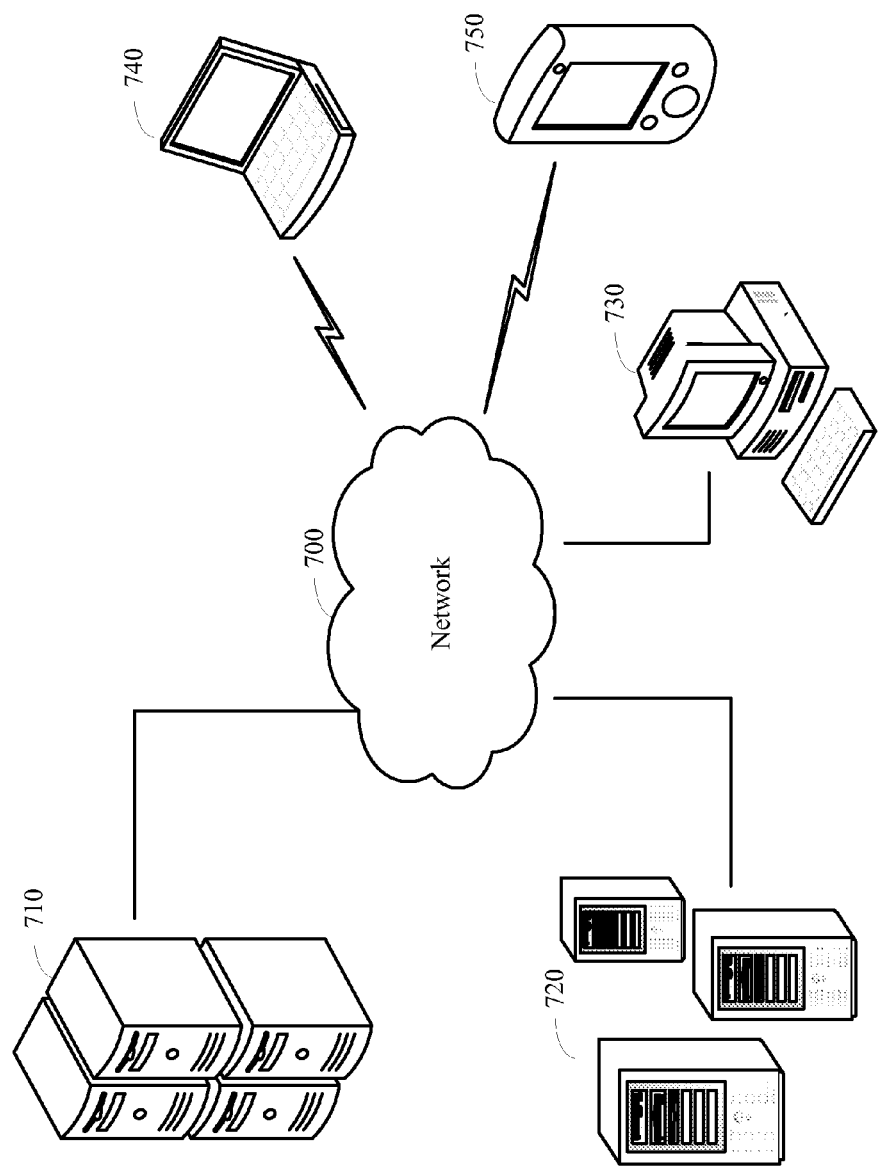
FIG. 7 is a simplified diagram of a mobile network environment in which specific embodiments of the present invention may be implemented.

FIG. 7 is a simplified diagram of a network environment in which specific embodiments of the present invention may be implemented. The various aspects of the invention may be practiced in a wide variety of network environments (represented by network 700) including, for example, TCP/IP-based networks, telecommunications networks, wireless networks, etc. In addition, the computer program instructions with which embodiments of the invention are implemented may be stored in any type of computer-readable media, and may be executed according to a variety of computing models including, for example, on a stand-alone computing device, or according to a distributed computing model in which various of the functionalities described herein may be effected or employed at different locations.

The software program implementing various embodiments may be executed on the desktop computer 730, notebook computer 740, handheld computer 750, etc. These computers may access the Network 700 either via wired connections or wireless connections.

One or more various types of servers 710, 720 are also communicatively connected to the Network 700. For example, application server 710 may be hosting one or more websites, while DNS server 720 may perform name-to-IP resolutions for the various computer systems 730, 740, 750.

The present invention has several advantages. First, the methods described in FIGS. 2-6 may be implemented as stand-alone software applications. Once such a software application is installed on a computer, it may be executed independently and does not require support from other devices, such as servers or databases. Second, by applying multiple rules during the detection process, different aspects of the pharming attacks are addressed. That is, different rules aim to protect the computer system from different types of pharming attacks, e.g., attacks on the DNS server, on the local DNS settings and/or Hosts file, etc. Although FIGS. 3-6 only describes four rules, additional rules may be applied that address other aspects of the pharming attacks. Similarly, although FIG. 1 only shows two monitors, the DNS Settings Monitor and the Hosts File Monitor, additional monitors may be added to monitor other changes to the computer system, especially changes to the Internet Protocol properties and/or settings.

Figure 8A:
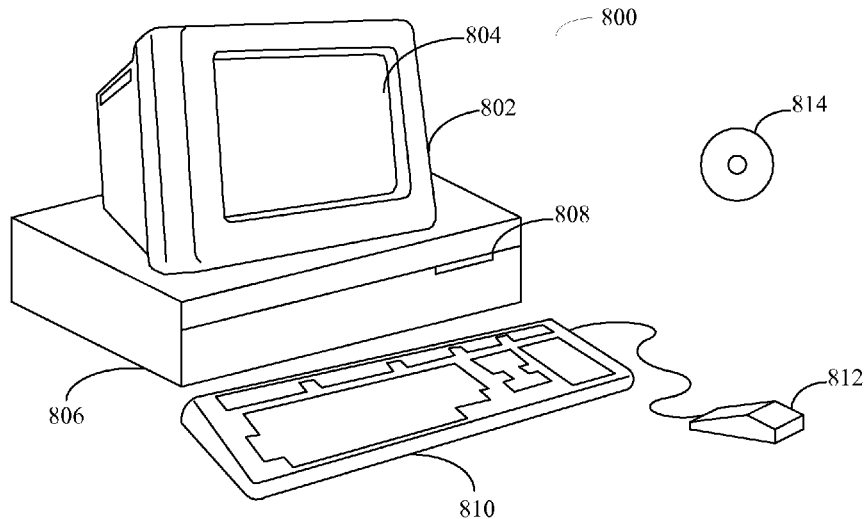
FIGS. 8A and 8B illustrate a computer system suitable for implementing embodiments of the present invention.
Figure 8B:
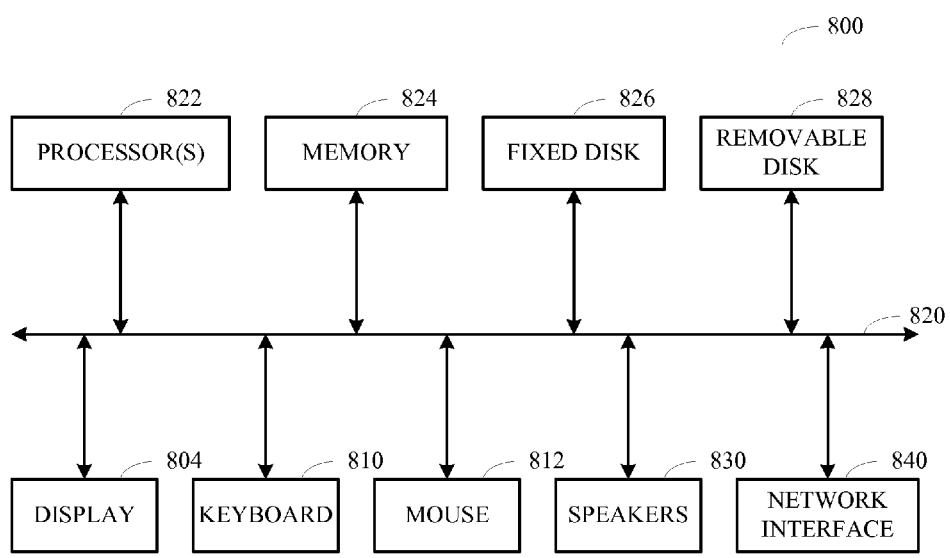

FIGS. 8A and 8B illustrate a computer system 800 suitable for implementing embodiments of the present invention. FIG. 8A shows one possible physical form of the computer system. Of course, the computer system may have many physical forms including an integrated circuit, a printed circuit board, a small handheld device (such as a mobile telephone or PDA), a personal computer or a super computer. Computer system 800 includes a monitor 802, a display 804, a housing 806, a disk drive 808, a keyboard 810 and a mouse 812. Disk 814 is a computer-readable medium used to transfer data to and from computer system 800.

FIG. 8B is an example of a block diagram for computer system 800. Attached to system bus 820 are a wide variety of subsystems. Processor(s) 822 (also referred to as central processing units, or CPUs) are coupled to storage devices including memory 824. Memory 824 includes random access memory (RAM) and read-only memory (ROM). As is well known in the art, ROM acts to transfer data and instructions uni-directionally to the CPU, and RAM is used typically to transfer data and instructions in a bi-directional manner. Both of these types of memories may include any suitable of the computer-readable media described below. A fixed disk 826 is also coupled bi-directionally to CPU 822; it provides additional data storage capacity and may also include any of the computer-readable media described below. Fixed disk 826 may be used to store programs, data and the like and is typically a secondary storage medium (such as a hard disk) that is slower than primary storage. It will be appreciated that the information retained within fixed disk 826, may, in appropriate cases, be incorporated in standard fashion as virtual memory in memory 824. Removable disk 828 may take the form of any of the computer-readable media described below.

CPU 822 is also coupled to a variety of input/output devices such as display 804, keyboard 810, mouse 812 and speakers 830. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 822 optionally may be coupled to another computer or telecommunications network using network interface 840. With such a network interface, it is contemplated that the CPU might receive information from the network, or might output information to the network in the course of performing the above-described method steps. Furthermore, method embodiments of the present invention may execute solely upon CPU 822 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

While this invention has been described in terms of several preferred embodiments, there are alterations, permutations, and various substitute equivalents, which fall within the scope of this invention. It should also be noted that there are many alternative ways of implementing the methods and apparatuses of the present invention. For example, despite the references to the Internet and virtual communities above, embodiments are contemplated in which most or even all of the functionalities described herein for generating a profile are performed on a single, stand-alone computing device. It is therefore intended that the following appended claims be interpreted as including all such alterations, permutations, and various substitute equivalents as fall within the true spirit and scope of the present invention.

What is claimed is:

1. A method of detecting changes to IP addresses obtained from name-to-IP resolutions, comprising the following computer-implemented steps:
    requesting that a host name be mapped;
    receiving an IP address, wherein said host name has been mapped to said IP address through a name-to-IP resolution process;
searching a historical database using a computer to retrieve historical data related to said IP address;
    applying a plurality of rules using said computer using said historical data;
    producing a score for each of the plurality of rules to obtain a plurality of scores, wherein each of the plurality of scores is greater than or equal to 0;
    summing up the plurality of scores to calculate a total score;
    storing the host name, the IP address and an IP address of a DNS server in said historical database if the total score is less than or equal to the predefined value, wherein the DNS server performs the name-to-IP resolution process that maps the host name to the IP address; and
    triggering an alert if the total score is greater than a predefined value.

2. A method of detecting changes to IP addresses obtained from name-to-IP resolutions, comprising the following computer-implemented steps:
    requesting that a host name be mapped;
    receiving an IP address, wherein said host name has been mapped to said IP address through a name-to-IP resolution process;
    searching a historical database using a computer to retrieve historical data related to said IP address;
    applying a plurality of rules using said computer using said historical data, one of said rules including
        calculating a distance between the IP address and each of at least one IP address stored in the historical data that is associated with the host name to obtain at least one distance, said distance being the absolute value of the numerical calculated difference, wherein said each of at least one IP address is an historical IP address for said host name, and
        summing up the at least one distance to calculate a total distance, wherein said rule produces a positive score if the total distance is greater than a predefined distance and a zero score if the total distance is less than or equal to the predefined distance;
    producing a score for each of the plurality of rules to obtain a plurality of scores, wherein each of the plurality of scores is greater than or equal to 0;
    summing up the plurality of scores to calculate a total score; and
    triggering an alert if the total score is greater than a predefined value.

3. A method of detecting changes to IP addresses obtained from name-to-IP resolutions, comprising the following computer-implemented steps:
    requesting that a host name be mapped;
    receiving an IP address, wherein said host name has been mapped to said IP address through a name-to-IP resolution process;
    searching a historical database using a computer to retrieve historical data related to said IP address;
    applying a plurality of rules using said computer using said historical data, including
    producing a positive score if the historical data indicates that an IP address of a DNS server of the DNS settings of a computer system has been modified during a first predefined time period and a zero score if the historical data indicates that the IP address of said DNS server of said DNS settings has not been modified during the first predefined time period;
    producing a score for each of the plurality of rules to obtain a plurality of scores, wherein each of the plurality of scores is greater than or equal to 0;
    summing up the plurality of scores to calculate a total score; and
    triggering an alert if the total score is greater than a predefined value.

4. A system for detecting changes to IP addresses obtained from name-to-IP resolutions, comprising:
    a computer system including a historical database;
    a DNS settings monitor configured to monitor modifications to a DNS settings of said computer system and to store said modifications into said historical database, wherein said historical database includes previous DNS settings of said computer system;
    a Hosts file monitor configured to monitor modifications to a Hosts file of the computer system and to store said modifications into said historical database; and
    a detector configured to detect changes in a present name-to-IP resolution process by applying a plurality of rules, wherein the host name is mapped to the IP address by the present name-to-IP resolution process, wherein one of said rules indicates whether an IP address of a DNS server of said DNS settings of said computer system has been modified during a predefined time period, and the plurality of rules produce a total score that is a sum of each individual score produced by each of the plurality of rules, wherein said detector being further configured to trigger an alert if said total score is greater than a predefined value.

5. The system, as recited in claim 4, further comprising:
a historical data repository configured to store information relating to each modification to the DNS settings, each modification to the Hosts file, and the name-to-IP resolution process.

6. The system, as recited in claim 5, wherein the information relating to each modification to the DNS settings comprises the DNS settings before the modification and a first timestamp indicating a time of the modification.

7. The system, as recited in claim 5, wherein the information relating to each modification to the Hosts file comprises the Hosts file after the modification and a second timestamp indicating a time of the modification.

8. The system, as recited in claim 5, wherein the information relating to the name-to-IP resolution process comprises the host name, the IP address, and a DNS server that performs the name-to-IP resolution process.

9. The system, as recited in claim 5, wherein the plurality of rules are applied in connection with the information stored in the historical data repository.

10. The system, as recited in claim 5, wherein the historical data repository is at least one table stored on the computer system.

11. The system, as recited in claim 4, further comprising:
an alert mechanism configured to send out an alert when the total score is greater than a predefined value.

12. The system, as recited in claim 11, wherein the alert mechanism is at least one selected from the group consisting of an email message, a message in a pop-up window, an instant message, a text message, and a telephone call.

13. A system as recited in claim 4 wherein said historical database includes a first IP address of a previous DNS server that has previously performed a past name-to-IP resolution process for said host name, wherein said name-to-IP resolution process uses a current DNS server having a second IP address, and wherein one of said rules compares said second IP address of said current DNS server with said first IP address of said previous DNS server.

14. A system as recited in claim 13 wherein said rule produces a positive score if said first IP address differs from said second IP address and a zero score if said first and second IP addresses are the same.

15. A system as recited in claim 4 wherein said historical database includes a previous Hosts file of said computer system, wherein one of said rules indicates whether said Hosts file of the computer system has been modified.

16. A system as recited in claim 15, wherein said rule produces a positive score if said historical data indicates that said Hosts file of said computer system has been modified during a predefined time period and a zero score if said historical data indicates that said Hosts file has not been modified during said predefined time period.

17. A system as recited in claim 15 wherein said Hosts file and said previous Hosts file both store information that maps host names to IP addresses.

18. A system as recited in claim 4 wherein said rule produces a positive score if said IP address of said DNS server of said DNS settings of said computer system has been modified during said predefined time period and a zero score if said IP address of said DNS server of said DNS settings of said computer system has not been modified during said predefined time period.

19. A system as recited in claim 4 wherein said Hosts file stores information that maps host names to IP addresses.

20. A system for detecting changes to IP addresses obtained from name-to-IP resolutions, comprising:
a computer system including a historical database;
a DNS settings monitor configured to monitor modifications to a DNS settings of said computer system and to store said DNS modifications into said historical database;
a Hosts file monitor configured to monitor modifications to a Hosts file of the computer system and to store said Hosts modifications into said historical database, wherein said historical database includes previous IP addresses associated with a host name, wherein each of said previous IP addresses is an historical IP address for said host name; and
a detector configured to detect changes in a present name-to-IP resolution process by applying a plurality of rules to said host name and an IP address, wherein said host name is mapped to said IP address by the present name-to-IP resolution process, wherein one of said rules calculates a distance between said IP address and each of at least one of said previous IP addresses to obtain at least one numerical distance, wherein said rule produces a positive score if said distance is greater than a predefined distance and a zero score if said distance is less than or equal to the predefined distance, and wherein the plurality of rules produce a total score that is a sum of each individual score produced by each of the plurality of rules, wherein said detector being further configured to trigger an alert if said total score is greater than a predefined value.

* * * * *